US012809717B2

(12) United States Patent
Ickowicz et al.

(10) Patent No.: US 12,809,717 B2
(45) Date of Patent: Nov. 24, 2026

(54) INTERACTIVE PANIC MODE TO MINIMIZE STORAGE RECOVERY TIME

(71) Applicant: Dell Products L.P., Round Rock, TX (US)

(72) Inventors: Gadi Ickowicz, Modin (IL); Vladimir Shveidel, Pardes-Hana (IL); Tal Zohar, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/178,663

(22) Filed: Apr. 14, 2025

(65) Prior Publication Data

US 2026/0319880 A1 Oct. 15, 2026

(51) Int. Cl.
*G06F 11/00* (2006.01)
*G06F 11/07* (2006.01)

(52) U.S. Cl.
CPC ........ *G06F 11/0793* (2013.01); *G06F 11/073* (2013.01); *G06F 11/0772* (2013.01)

(58) Field of Classification Search
CPC . G06F 11/0793; G06F 11/073; G06F 11/0772
See application file for complete search history.

(56) References Cited

U.S. PATENT DOCUMENTS 7,770,056 B2 * 8/2010 Malaviya ............ G06F 11/0778 714/15
2004/0172219 A1 * 9/2004 Curry, III ............ G06F 11/0706 714/E11.21
2021/0117265 A1 * 4/2021 Noe .................... G06F 11/3055

* cited by examiner

*Primary Examiner* — Jason B Bryan
(74) *Attorney, Agent, or Firm* — Chamberlain Hrdlicka; Aly Z. Dossa

(57) ABSTRACT

A method for responding to a panic in a system includes entering an interactive mode with a target process in a computing device of the system. The target process crashes prior to entering the interactive mode. The method further includes loading a library into a runtime of the computing device. Moreover, the method includes initiating an execution of the target process in the interactive mode on the computing device. Further, the method includes making, a first determination that the panic is triggered while executing the target process. Additionally, the method includes obtaining a context of the target process from memory of the system that caused the panic. The context is copied to a local memory of the computing device. Finally, the method includes executing, by a runtime interpreter, a callback using the library. The callback specifies a function, and the execution of the callback generates a panic resolution action.

20 Claims, 3 Drawing Sheets

INTERACTIVE PANIC MODE TO MINIMIZE STORAGE RECOVERY TIME

BACKGROUND

In systems that include persistent metadata, when a corruption occurs in persistent data, the system can become unavailable due to repeated crashes when trying to access the corrupted section (e.g., causing a rolling panic). Recovery times for such a corruption can be extremely long due to complex investigations to arrive at the root cause, designing a fix, and implementing the fix which may be not simple to deploy on computing devices. Each such issue might cause a long period of system unavailability for users of the systems.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

DETAILED DESCRIPTION

Figure 1:
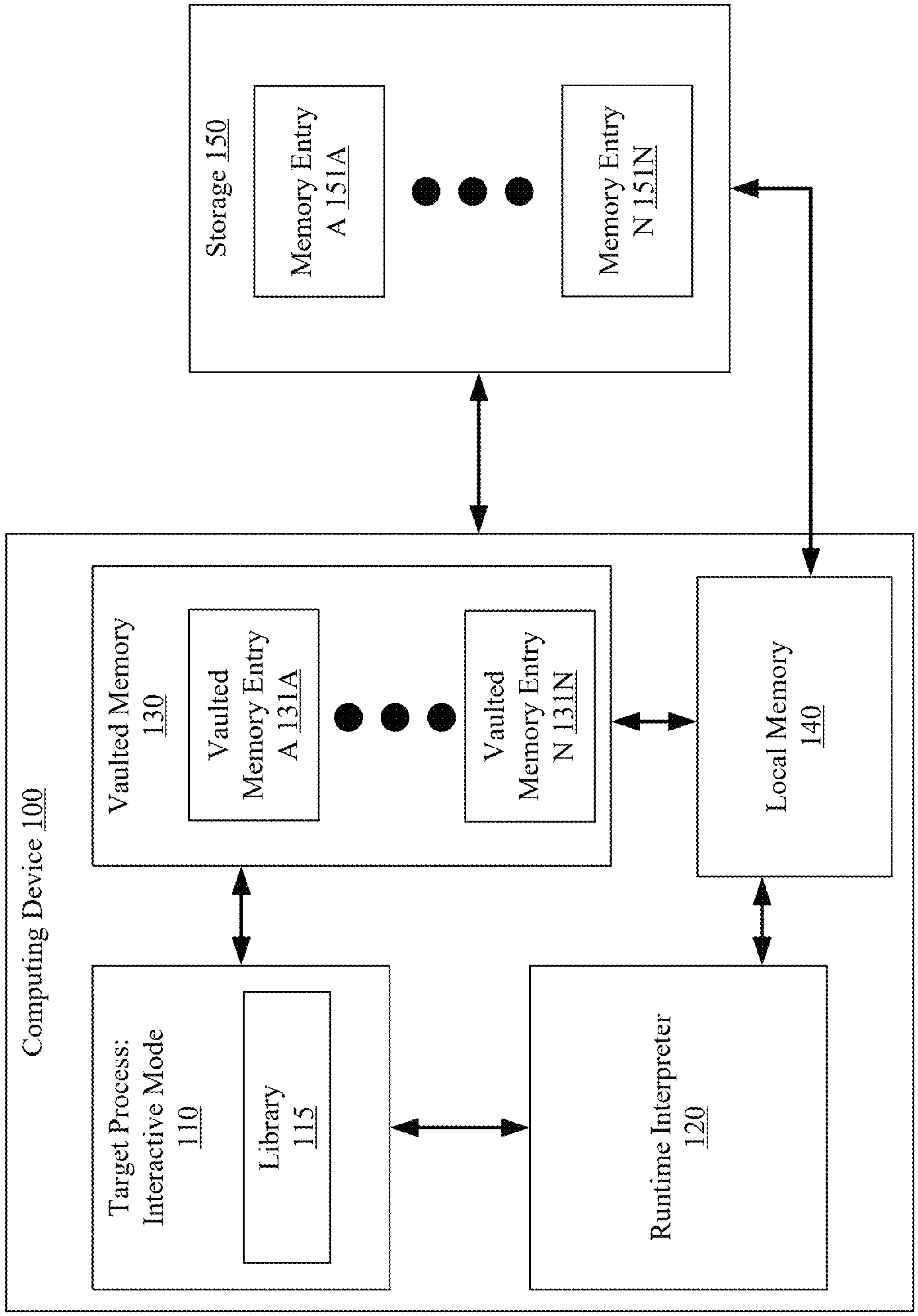
FIG. 1 shows a diagram of a system in accordance with one or more embodiments disclosed herein.

In a storage array and other systems, metadata is saved persistently for recovery purposes when processes restart and need to load all the metadata. If a corruption occurs and is persisted in such a way, the corruption causes a process to reach a specific error flow repeatedly during this recovery and crash repeatedly (e.g., a rolling panic). Even if the corruption is in a single memory entry in a single component of the system, an entire protection domain or storage may become unavailable to a user.

In traditional systems, rolling panic recovery times caused by data unavailability, data inconsistency, and data loss can be very long due to complex and long investigations and fixing protocols. Initial investigation usually involves: (i) looking at logs and traces for the system, (ii) analyzing the current situation to identify the problematic memory entry and understand how the error occurred, and (iii) formulating a plan for recovery of the system. After the initial investigation, the recovery process often involves a completely different set of tools. The recovery process includes: (i) creating a custom tailor-made version of an application and (ii) packaging and uploading this application to a computing device of the system. Installing the application on the computing device may also involve an upgrade, which can be a complicated and time-consuming process. Other tools may be used to allow highly trained technicians to perform fixes of the corruption in the storage of the system. However, these tools often require a significant amount of time to find and reach the effected memory entry even after identifying the memory entry in the initial investigation. For at least the reasons discussed above, a different approach for responding panics may be beneficial.

Embodiments disclosed herein relate to a method for responding to a panic in a system during a process using interactive panic modes. The interactive panic modes allow for an option to trigger a specific external callback when enabled. When a panic occurs, the process enters into an interactive mode (instead of forcing a crash). The interactive mode contains the relevant context at the point of failure/inconsistency by nature of being executed during the regular flow when encountering the issue (i.e., error). A callback is executed in the interactive node with a function to generate a panic resolution action. If the panic resolution action corrects the error causing the panic, the system can continue normal execution of the process until the next error is encountered in an iterative recovery process. Such an approach allows for a surgical and quick recovery by allowing fixes to be performed at the exact point where an issue is detected (or even performing a partial fix that will allow the system to continue run just to make the rest of the data available). An application binary in a specific interactive mode (i.e., recovery mode) is used as the recovery tool for quick recovery after the panic, when the application is unable to start/restart. The installation of specific support tools on-site is not required in the embodiments. The interactive mode includes configured callbacks that use the corresponding context from the panic to attempt to fix the panic instead of forcing an application crash (e.g., the normal mode behavior). Three types of callbacks include (i) information mode, (ii) fix mode and (iii) interactive framework mode. The embodiments allow writing callbacks in Python; however, those skilled in the art will appreciate that the invention is not limited to Python, rather the invention may be implemented using any other programming language (including but not limited to any other interpreted programming language). The interactive mode may be an iterative recovery process (e.g., once the fix is performed the system can continue normal execution until the next problem is encountered). The interactive mode includes the benefits of reducing the recovery time caused by data unavailability, data inconsistency, and data loss by cutting investigation time and fixing complexity in response to panics.

The following describes various embodiments disclosed herein.

FIG. 1 shows a diagram of a system in accordance with one or more embodiments disclosed herein. The system includes a computing device (100), and a storage (150). Each of these components shown in FIG. 1 is described below.

The system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 1 may be connected via a network fabric (not shown). A network fabric refers to the interconnected topology and structure of network elements, e.g., switches, routers, and links, which work together to provide data transmission within between the components. The network fabric may be implemented using a spine-leaf topology, where every leaf switch connects to each spine switch. Those skilled in the art will appreciate that any other type of network (or network topology) may be used without departing from the disclosure.

The computing device (100) includes a target process (110), a runtime interpreter (120), a vaulted memory (130), and a local memory (140). The computing device (100) includes functionality to run processes on the storage (150). The computing device (100) also includes functionality to run a process in an interactive mode to respond to a panic. Each of these components is described below.

Figure 2:
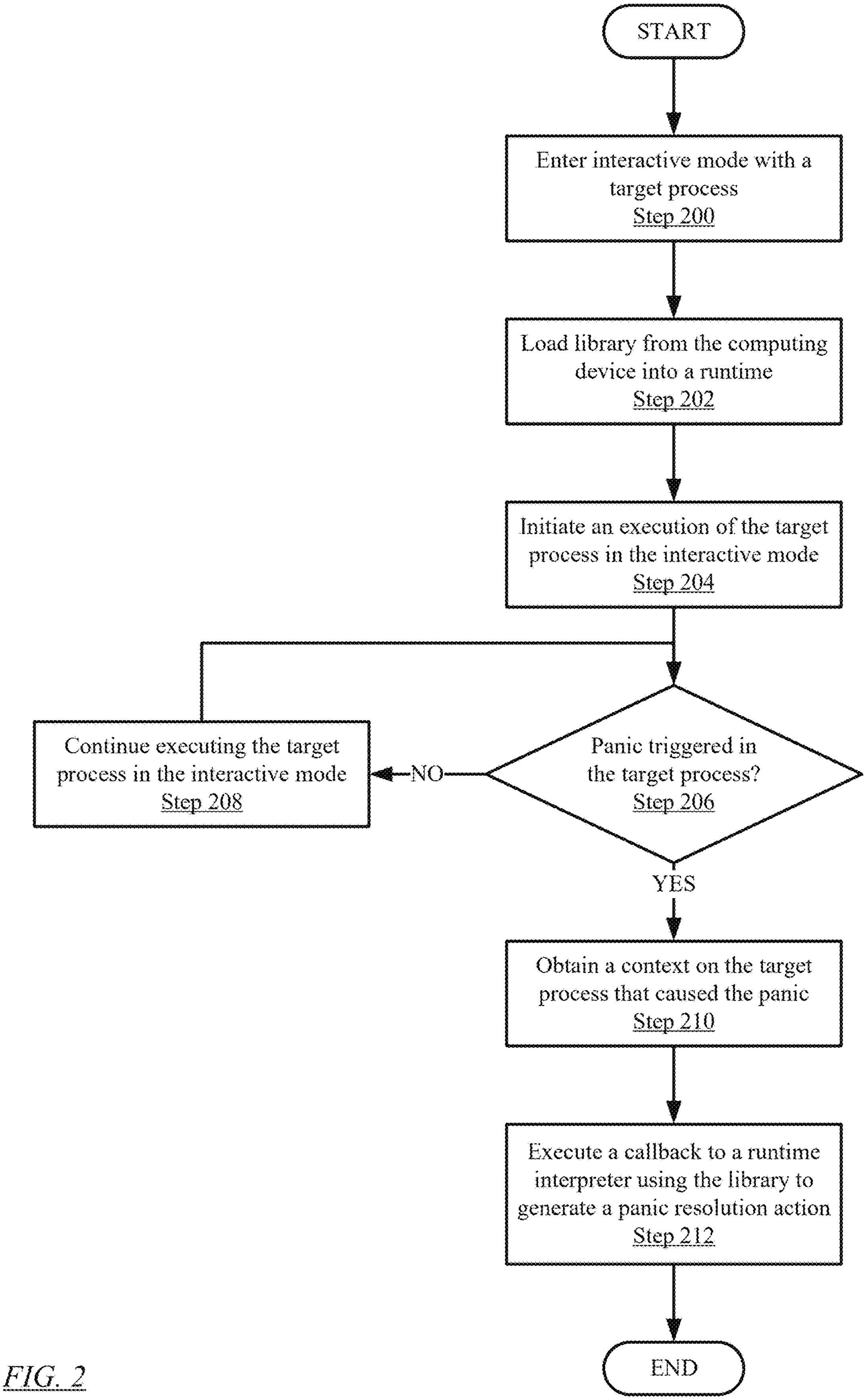
FIG. 2 shows a flowchart for a method for responding to a panic in a system in accordance one or more embodiments disclosed herein.
Figure 3:
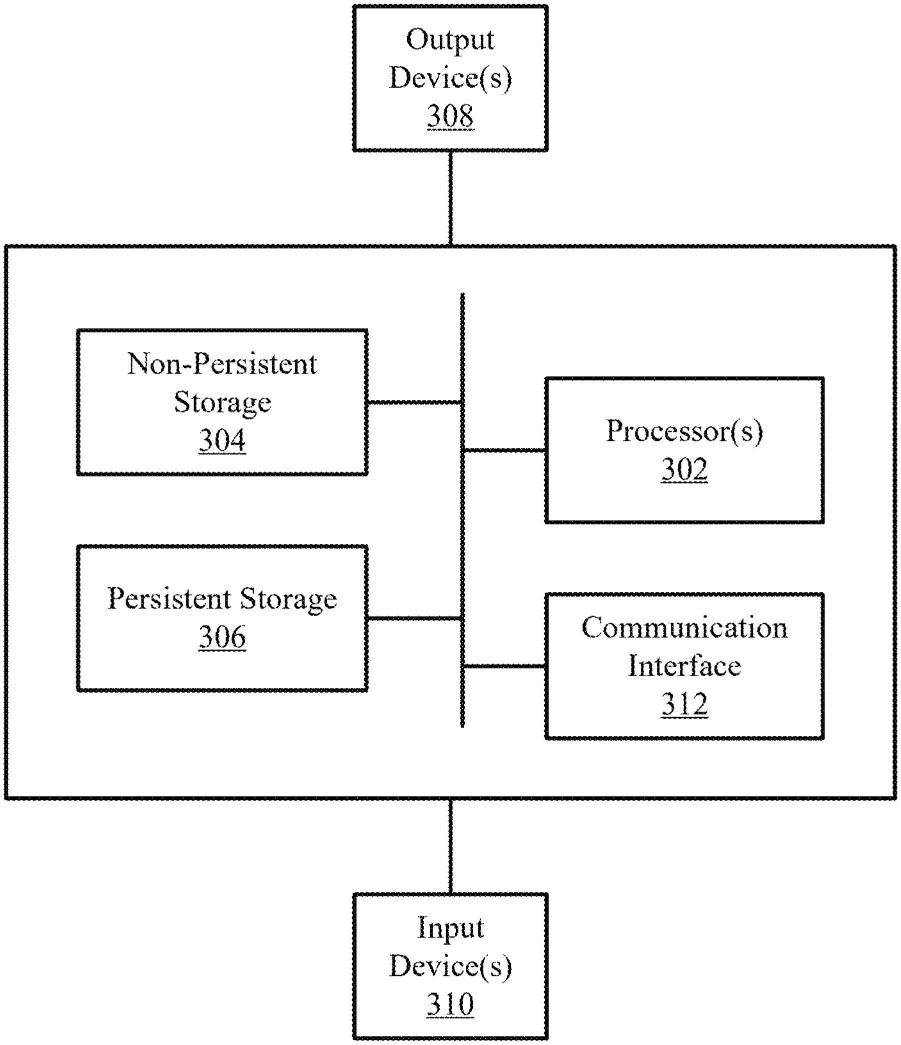
FIG. 3 shows a diagram of a computing device in accordance with one or more embodiments disclosed herein.

In one or more embodiments, the computing device (100) may be the one or more computing devices shown in FIG. 3. The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the computing device (100) described throughout this application and/or all, or a portion thereof, of the method illustrated in FIG. 2.

In one or more embodiments, the target process (110) is a process that is executed on the computing device (100) and interacting with the storage (150). The target process (110) may be in a normal mode or an interactive mode as shown in FIG. 1. Interactive mode is used when the target process encounters a panic. In interactive mode, a callback is used to attempt to resolve the panic. The target process (110) may be, e.g., a storage retrieval process. The target process (110) includes a library (115).

The library (115) includes functionality to call Python code to execute in the runtime interpreter (120). The Python code includes Python functions that can use relevant context and hints about the panic. The Python code is stored in the library (115). The Python code may include the callbacks of the interactive mode in Python wrappers which may be loaded into or linked to the runtime interpreter (120) using a Python/C application programming interface or application binary interface (e.g., allowing Python to be embed directly into C code). The callbacks each include a general Python callback and a function. The general Python callback acts as a dispatcher that receives a direct call in response to the panic and redirects to a particular function based on a context of the panic and configuration mapping. The function does the actual handling of the callback and is deployed in the runtime interpreter (120) from the library (115). The function can be replaced easily in the runtime interpreter (120) because Python does not require compilation ahead of time. Functions may include print functions to print the context to a screen to be viewed by a technician and fix functions that allow a technician to fix a memory entry causing the panic.

In one or more embodiments, the runtime interpreter (120) includes functionality to execute the callback. The runtime interpreter (120) is operatively connected to the target process (110) to import the callback from the library (115). The runtime interpreter (120) may execute the callback in order to address the panic as shown in FIG. 2.

In one or more embodiments, the vaulted memory (130), i.e., non-volatile storage, includes functionality to store vaulted memory entries from the storage (150) that are used during the target process (110). The vaulted memory includes a plurality of vaulted memory entries (131A, 131N). In one or more embodiments, the vaulted memory entries (131A, 131N) include the contents of memory entries (e.g., 151A, 151N) from the storage (150) in which there are errors (i.e., an error(s) that triggered the panic). The content is stored in the vaulted memory (130) of the computing device (100) to enable the callback functions to perform operations on the content (e.g., read, write, modify, etc.). The plurality of vaulted memory entries (131A, 131N) may include vaulted memory entry A (131A), vaulted memory entry N (131N), and any other vaulted memory entry.

In one or more embodiments, the local memory (140) is operatively connected to the vaulted memory (130) and the storage (150) and includes functionality to receive context from the vaulted memory (130) and the storage (150). The context includes information where the inconsistencies are encountered that caused the panic (e.g., point of failure). This includes a memory entry with an error and additional information that might be hint about the cause of the error. The local memory (140) is operatively connected to the runtime interpreter (120). The runtime interpreter (120) executes the functions on the context in the local memory (140) to investigate and perform fixes directly on the context. In one or more embodiments the memory entry may be modified or deleted. When modified, the memory entry may be transmitted back to the vaulted memory (130) or the storage (150) to end the panic.

In one or more embodiments, the storage (150) includes a plurality of memory entries (151A, 151N). The plurality of memory entries (151A, 151N) may include memory entry A (151A), memory entry N (151N), and any other memory entry. The plurality of memory entries (151A, 151N) may include a memory entry that includes an error causing the panic.

In one or more embodiments, the storage (150) may be implemented as a file store. When implemented as a file store, the storage (150) stores data as files. The files may be organized within a hierarchy using, for example, directories and/or folders. In one or more embodiments, the storage (150) may be implemented as an object store. When implemented as an object store, the data is stored as discrete units called objects (instead of files). Each object includes the data itself, metadata that describes the data, and a unique identifier, allowing for efficient retrieval and organization.

The storage (150) may be implemented as a computing device. The computing device may be, for example, a server, a distributed computing system, or a cloud resource. The computing device may include one or more processors, memory (e.g., random access memory), and persistent storage (e.g., disk drives, solid state drives, etc.). The storage (150) may utilize, to store data, volatile storage, non-volatile storage, or any combination thereof to store the aforementioned data. Examples of storage include (but are not limited to): a hard disk drive (HDD), a solid-state drive (SSD), random access memory (RAM), flash memory, a tape drive, a fibre-channel (FC) based storage device, a non-volatile memory express (NVMe) device, a NVMe over Fabrics (NVMe-oF) device, resistive RAM (ReRAM), and persistent memory (PMEM).

In one or more embodiments, the storage (150) is implemented as a logical device(s). Each logical device may utilize the computing resources of any number of computing devices and thereby provide the functionality of the storage (150) described throughout this application and/or all, or a portion thereof, of the methods illustrated in FIG. 2.

Turning to FIG. 2, FIG. 2 shows a flowchart for a method for responding to a panic in a system in accordance one or more embodiments disclosed herein. The method of FIG. 2 may be performed by, for example, the computing device (e.g., 100, FIG. 1). Other components of the system of FIG. 1 may perform all, or a portion, of the method of FIG. 2 without departing from the disclosure.

While the various steps in the flowchart of FIG. 2 are presented and described sequentially, one of ordinary skill in the relevant art will appreciate that some or all of the steps may be executed in different orders, may be combined, or omitted, and some or all steps may be executed in parallel.

In Step 200, a target process (e.g., 110, FIG. 1) of the computing device enters interactive mode. The target process enters interactive mode due to crashing when executing the target process. The target process crashes due to a panic.

In one or more embodiments, the panic is caused by at least one corruption (e.g., error) in a memory entry the target process is attempting to access. The at least one corruption may be in a memory entry of the storage (e.g., 150, FIG. 1) or a vaulted memory entry of the vaulted memory (e.g., 130, FIG. 1). In one or more embodiments, the target process may fail during storage start. The same target program (in both the normal mode and the interactive mode) is using the same storage binary which allows for attempts to correct the panic in the interactive mode. In one or more embodiments, the target process may fail anytime during the target process.

In one or more embodiments, a user of the target process may attempt to restart the target process leading to a rolling panic when the target process fails again at the at least one corruption. In one or more embodiments, the interactive mode is used only for particular panic types (e.g., where corruptions are encountered in persistent data which will cause rolling panics) and other panics are handled in normal mode. In one or more embodiments, the interactive mode is used for all panics. In one or more embodiments, a technician will attempt to fix the panic by entering the interactive mode. The interactive mode is part of the target process of the computing device, which has access to the fully integrated storage platform (e.g., the storage). The interactive mode may be enabled via a command line parameter.

For example, a user starts the target process of the computing system. The target process includes a read of memory entries in the storage. During the start of the target process, a memory entry is read that includes a corruption. The target process fails, and the user restarts the target process. Upon reaching the memory entry with the corruption, the target process fails again indicating that the computing device is in a rolling panic. In response to the rolling panic, a technician restarts the target process in an interactive mode.

In Step 202, the computing device loads a library (e.g., 115, FIG. 1) into a runtime of the computing device. The library is stored in computing device on which the target process is executing. The library includes Python code that contains callbacks used to investigate and fix the panic. The callbacks use Python due to it not requiring compilation ahead of time. Python also allows for working directly on binary buffers of the memory entries using ctypes and CFFi modules that interact directly with the memory entries in C or C++ code. The Python code also includes a Python interpreter (also referred to a Runtime Interpreter (120)) that executes the functions included in the callbacks as shown in Step 212. The Python code is loaded into the runtime interpreter (e.g., 120, FIG. 1) where the investigation and fixing of the panic will occur.

In one or more embodiments, all callbacks are loaded into the runtime interpreter allowing for flexibility for which callback to use when the panic is reached. In one or more embodiments, a callback is selected when entering interactive mode in Step 200 and only that callback is loaded into the runtime interpreter. Returning to the example described in Step 200, after the target process enters interactive mode, the Python code and callbacks of the interactive mode are loaded into the runtime interpreter for use when the panic is reached in the target process.

In Step 204, the computing device initiates an execution of the target process in the interactive mode. The target process begins in the interactive mode and proceeds until the panic is triggered. The computer device monitors the target process to determine when the panic is triggered as shown in Step 206.

In Step 206, the computing device makes a first determination whether the panic is triggered in the target process. If YES, the method proceeds to Step 210. If NO, the method proceeds to Step 208. When the target process reaches the panic in the interactive mode, the framework allows preparing arbitrary business logic at the exact point (and with the exact context) where an inconsistency is encountered to perform recovery of the system.

Returning to the example described in Step 202, the target process reaches the error in the memory entry of the storage and triggers the panic.

In Step 208, the computing device continues executing the target process in the interactive mode. After Step 208, the method returns to Step 206 to determine when the panic started. The target process may continue to cycle through Steps 206 and 208 until the panic is triggered.

In Step 210, the computing device obtains a context on the target process that caused the panic. The context is part of the memory used during the target process. The context is copied to a local memory (e.g., 140, FIG. 1) of the computing device. The context describes the panic and includes the cause of the panic. In one or more embodiments, the context specifies a vaulted memory entry that is located in the vaulted memory. The vaulted memory entry may include the error that caused the panic. In one or more embodiments, the context specifies a memory entry that is located in the storage of the memory. The memory entry may include the error that caused the panic. Returning to the example described in Step 206, the context including the memory entry with the error is copied to the local memory.

In Step 212, the computing device executes a callback to the runtime interpreter using the library to generate a panic resolution action. The callback specifies a function, which is stored in the library loaded into the runtime interpreter. The runtime interpreter may execute the callback using Python code. The callback may correspond to one of three modes. These modes may include, but are not limited to, information mode, fix mode, and interactive framework mode. In one or more embodiments, the mode is selected in Step 212. In one or more embodiments, the mode is selected in Step 200 and only the corresponding callback is loaded into the interactive mode.

In one or more embodiments, the information mode is for investigation of issues and checking for inconsistencies during the panic. The callback information mode will only have read only access to the context to ensure that no changes can be made to the context. This is enforced on the panic callback side preventing possible bugs on the callback side from modifying the system being investigated. In the information mode, the panic resolution action is displaying the context on a screen to investigate the panic. When information mode is selected, the callback includes a print function (e.g., print_MD_entry). The print function is loaded into the runtime interpreter at the same time as the library in Step 202. The print function is then imported into the runtime interpreter. The print function is then executed, and the context is output to a screen to be viewed by the technician. The context includes the memory entry with the error allowing the technician to investigate the panic. Once the context is displayed to the screen, the runtime interpreter signals to the computing device that the function is executed and the computer device attempts to continue the target process. Because the memory entry is not modified, the attempt to the continue the target process may fail and the method can repeat or another method of addressing the panic may be used.

Returning to the example described in Step 210, the runtime interpreter, using the callback in information mode, imports the print_MD_entry into the Python interpreter. The runtime interpreter executes print_MD_entry(entry) causing the context including the memory entry with the error to be displayed on a screen for the technician. The technician then investigates the panic by reviewing the context. Once the technician finishes the investigation, the method repeats to use a different mode.

The fix mode is for making changes, fixing errors, and fixing inconsistencies in the context. The callback fix mode will have read, modify and write access to the context. The fix mode allows for modifications to the memory entry with the error. The modification may be a full fix to the relevant data or workaround to allow the system to continue to operate in a consistent mode (including deleting the memory entry).

In fix mode, the panic resolution action is modifying the memory entry to form a modified memory entry to attempt to end the panic. When fix mode is selected, the callback includes a fix function (e.g., fix_corruption_type_7). The fix function is loaded into the runtime interpreter at the same time as the library in Step 202. The fix function is then imported into the runtime interpreter. The fix function is then executed, and the memory entry is modified as needed to correct the error forming a modified memory entry. Once the memory entry is modified, the runtime interpreter signals to the computing device that the memory entry is modified, and the memory entry needs to be persisted. The modified memory entry is then persisted to where the memory entry was copied to end the panic. In one or more embodiments, the error in the memory entry cannot be corrected and the modification of the memory entry is deleting the memory entry. The memory entry is then deleted from where the memory entry was copied to end the panic.

Returning to the example described in Step 210, the runtime interpreter, using the callback in fix mode, imports the fix_corruption_type_7 into the runtime interpreter. The runtime interpreter executes fix_corruption_type_7 (entry) the memory entry is modified changing in the metadata of the memory entry a header version from 7 (incorrect value) to 6 (correct value). This corrects the error forming a modified memory entry. Once the memory entry is modified, the runtime interpreter signals to the computing device that the memory entry is modified, and the memory entry needs to be persisted. The modified memory entry is then persisted to the storage to end the panic.

The interactive framework mode allows for any combination of operations included in the information mode and the fix mode. The interactive framework mode is an open framework (e.g., metadata (MD) Editor) that is aware of the storage layout. The interactive framework mode provides an interactive Python prompt and can perform an arbitrary set of read/fix operations, as it generally has access to all system metadata and the full power of the Python language to combine simple operations into more complex business logic. The interactive framework mode and storage setup is completed by a dedicated framework command. All storage timeouts are disabled during the interactive framework mode. When interactive framework mode is selected, the callback includes the MD editor. The MD editor is loaded into the runtime interpreter at the same time as the library in Step 202. The MD editor is then imported into the runtime interpreter. The MD editor is then executed, including a plurality of functions for performing a set of read and write commands. These read and write commands include the context being displayed on the screen and the memory entry being modified as needed to correct the error forming a modified memory entry. Once the memory entry is modified, the runtime interpreter signals to the computing device that the memory entry is modified, and the memory entry needs to be persisted. The modified memory entry is then persisted to where the memory entry was copied to end the panic.

Returning to the example described in Step 210, the runtime interpreter, using the callback in the interactive framework mode, imports the MD editor into the runtime interpreter. The runtime interpreter executes the MD editor. The MD editor includes a plurality of functions for performing a set of read and write commands. The context is displayed on the screen for the technician to identify the error in the memory entry. The memory entry is then modified changing in the metadata of the memory entry a header version from 7 (incorrect value) to 6 (correct value) based on the identified error. This corrects the error forming a modified memory entry. Once the memory entry is modified, the runtime interpreter signals to the computing device that the memory entry is modified, and the memory entry needs to be persisted. The modified memory entry is then persisted to the storage to end the panic.

In one or more embodiments, once the error in the memory entry is fixed in Step 212, the method returns to Step 206 to reach the next memory entry with an error. The process may repeat until all memory entries with errors are corrected. In one or more embodiments, after Step 212, the method may end.

Those skilled in the art will appreciated that while the above description described in the invention using Python, the invention is not limited to Python; rather, any programming language (including any interpreted language) can be used to implement the invention.

As discussed above, embodiments of the disclosure may be implemented using computing devices. FIG. 3 shows a diagram of a computing device in accordance with one or more embodiments disclosed herein. The computing device may include one or more computer processor(s) (302), non-persistent storage (304) (e.g., volatile memory, such as RAM, cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the disclosure, the processor(s) (302) may be an integrated circuit for processing instructions. For example, the computer processor(s) may be one or more cores or micro-cores of a processor. The computing device may also include one or more input devices (310), such as a touchscreen, keyboard, mouse, microphone, touchpad, electronic pen, or any other type of input device. Further, the communication interface (312) may include an integrated circuit for connecting the computing device to a network (not shown) (e.g., a local area network (LAN), a wide area network (WAN) such as the Internet, mobile network, or any other type of network) and/or to another device, such as another computing device.

In one embodiment of the disclosure, the computing device may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to enable the computer processor to perform one or more embodiments described herein.

The problems discussed above should be understood as being examples of problems solved by embodiments of the disclosure disclosed herein and the disclosure should not be limited only to solving the same/similar problems. The disclosure is broadly applicable to address a range of problems beyond those discussed herein.

Specific embodiments are described with reference to the accompanying figures. In the above description, numerous details are set forth as examples. It will be understood by those skilled in the art, that one or more embodiments of the present disclosure may be practiced without these specific details, and that numerous variations or modifications may be possible without departing from the scope. Certain details known to those of ordinary skill in the art are omitted to avoid obscuring the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the disclosure has been described above with respect to a limited number of embodiments, those skilled in the art, having the benefit of this disclosure, will appreciate that other embodiments can be devised which do not depart from the scope as disclosed herein. Accordingly, the scope of the disclosure should be limited only by the attached claims.

What is claimed is:

1. A method for responding to a panic in a system, comprising:

entering an interactive mode with a target process in a computing device of the system, wherein the target process crashes prior to entering the interactive mode;

loading, after entering the interactive mode, a library into a runtime of the computing device;

initiating, after loading the library, an execution of the target process in the interactive mode on the computing device;

making, after initiating the execution, a first determination that the panic is triggered while executing the target process;

obtaining, based on the first determination, a context of the target process from memory of the system that caused the panic, wherein the context is copied to a local memory of the computing device; and executing, by a runtime interpreter, a callback using the library after obtaining the context, wherein the callback specifies a function, and the execution of the callback generates a panic resolution action.

2. The method of claim 1, wherein the context comprises a memory entry that is located on a storage of the memory, wherein the memory entry has an error.

3. The method of claim 1, wherein the context comprises a vaulted memory entry that is located in a vaulted memory of the memory, wherein the vaulted memory entry has an error.

4. The method of claim 1, wherein the panic resolution action comprises the function displaying the context on a screen.

5. The method of claim 1, wherein the context comprises a memory entry and wherein the panic resolution action comprises the function modifying the memory entry to form a modified memory entry to end the panic.

6. The method of claim 5, wherein the modified memory entry is persisted to a storage of the system.

7. The method of claim 1, wherein the context comprises a memory entry and wherein the panic resolution action comprises the function deleting the memory entry from a storage of the system to end the panic.

8. The method of claim 1, wherein the context comprises a memory entry and wherein the panic resolution action comprises the function performing a set of read and write commands on the memory entry to form a modified memory entry to end the panic.

9. The method of claim 8, wherein the modified memory entry is persisted to a storage of the system.

10. The method of claim 1, wherein the runtime interpreter executes the callback using Python.

11. A non-transitory computer readable medium (CRM) comprising computer readable program code, which when executed by a computer processor enables the computer processor to perform a method for responding to a panic in a system, the method comprising:

entering an interactive mode with a target process in a computing device of the system, wherein the target process crashes prior to entering the interactive mode;

loading, after entering the interactive mode, a library into a runtime of the computing device;

initiating, after loading the library, an execution of the target process in the interactive mode on the computing device;

making, after initiating the execution, a first determination that the panic is triggered while executing the target process;

obtaining, based on the first determination, a context of the target process from memory of the system that caused the panic, wherein the context is copied to a local memory of the computing device; and executing, by a runtime interpreter, a callback using the library after obtaining the context, wherein the callback specifies a function, and the execution of the callback generates a panic resolution action.

12. The non-transitory CRM of claim 11, wherein the panic resolution action comprises the function displaying the context on a screen.

13. The non-transitory CRM of claim 11, wherein the context comprises a memory entry and wherein the panic resolution action comprises the function modifying the memory entry to form a modified memory entry to end the panic.

14. The non-transitory CRM of claim 13, wherein the modified memory entry is persisted to a storage of the system.

15. The non-transitory CRM of claim 11, wherein the context comprises a memory entry and wherein the panic resolution action comprises the function deleting the memory entry from a storage of the system to end the panic.

16. The non-transitory CRM of claim 11, wherein the context comprises a memory entry and wherein the panic resolution action comprises the function performing a set of read and write commands on the memory entry to form a modified memory entry to end the panic.

17. The non-transitory CRM of claim 16, wherein the modified memory entry is persisted to a storage of the system.

18. A system comprising: a processor;

storage comprising instructions, which when executed by the processor perform a method for responding to a panic in the system, the method comprising:

entering an interactive mode with a target process in a computing device of the system, wherein the target process crashes prior to entering the interactive mode;

loading, after entering the interactive mode, a library into a runtime of the computing device;

initiating, after loading the library, an execution of the target process in the interactive mode on the computing device;

making, after initiating the execution, a first determination that the panic is triggered while executing the target process;

obtaining, based on the first determination, a context of the target process from memory of the system that caused the panic, wherein the context is copied to a local memory of the computing device; and executing, by a runtime interpreter, a callback using the library after obtaining the context, wherein the callback specifies a function, and the execution of the callback generates a panic resolution action.

19. The system of claim 18, wherein the context comprises a memory entry that is located on a storage of the memory, wherein the memory entry has an error.

20. The system of claim 18, wherein the context comprises a vaulted memory entry that is located in a vaulted memory of the memory, wherein the vaulted memory entry has an error.

* * * * *